(12) United States Patent
Du (10) Patent No.: US 9,881,390 B2
(45) Date of Patent: Jan. 30, 2018

(54) METHOD AND APPARATUS FOR PROCESSING IMAGE DATA

(71) Applicant: Hisense Mobile Communications Technology Co., Ltd., Qingdao, Shandong (CN)

(72) Inventor: Wenjuan Du, Shandong (CN)

(73) Assignee: Hisense Mobile Communicationa Technology Co., Ltd., Qingdao, Shandong (CN)

( * ) Notice: Subject to any disclaimer, the term of this patent is extended or adjusted under 35 U.S.C. 154(b) by 0 days.

(21) Appl. No.: 14/972,294

(22) Filed: Dec. 17, 2015

(65) Prior Publication Data

US 2016/0232694 A1   Aug. 11, 2016

(30) Foreign Application Priority Data

Feb. 9, 2015 (CN) .......................... 2015 1 0067666

(51) Int. Cl.
*G06T 11/00* (2006.01)
*G06F 3/0484* (2013.01)

(52) U.S. Cl.
CPC .......... *G06T 11/00* (2013.01); *G06F 3/04847* (2013.01); *G06F 2203/04803* (2013.01); *G06F 2203/04804* (2013.01)

(58) Field of Classification Search
CPC .................. G06F 3/048; G06F 3/04847; G06F 2203/04804; G06F 2203/04803; G06T 11/00

See application file for complete search history.

(56) References Cited

U.S. PATENT DOCUMENTS 8,160,398 B1 * 4/2012 Avidan ................ G06T 3/0012
                                                                345/660
8,549,420 B1 * 10/2013 Tibbett ................ G06F 3/0485
                                                                715/765

(Continued)

FOREIGN PATENT DOCUMENTS

CN     101957981 A    1/2011
CN     103327246 A    9/2013

(Continued)

OTHER PUBLICATIONS

First Office Action received from the State of Intellectual Property of People's Republic of China for Application No. 201510067666.3 dated Jun. 16, 2017 with English translation (11 pp.).

(Continued)

*Primary Examiner* — Mark K Zimmerman
*Assistant Examiner* — Phuc N Doan
(74) *Attorney, Agent, or Firm* — Brinks Gilson & Lione (57) ABSTRACT

Embodiments of the present disclosure provide a method and apparatus for processing image data, the method including: generating a first window and a second window; loading preview image data in the first window; acquiring at least one of a feature image, current time information and geographical location information; loading at least one of the feature image, the time information and the geographical location information in the second window; and when receiving a generation instruction of the image data, embedding the at least one of the feature image, the time information and the geographical location information into generated target image data according to a first coordinate position, the first coordinate position being a coordinate of the at least one of the feature image, the time information and the geographical location information in the second window relative to the preview image data. The embodiments of the present disclosure achieve automation of post (Continued)

processing of the image data, greatly increase simplicity of operation, lower the operation threshold, and reduce the processing time.

12 Claims, 4 Drawing Sheets

(56) References Cited

U.S. PATENT DOCUMENTS

| | | | |
|---|---|---|---|
| 9,478,054 B1* | 10/2016 | Lewis | G06T 11/60 |
| 2004/0012702 A1 | 1/2004 | Ishige | |
| 2004/0184664 A1 | 9/2004 | Tuli | |
| 2006/0037990 A1* | 2/2006 | Geise | G01C 21/36 |
| | | | 228/101 |
| 2007/0249368 A1* | 10/2007 | Bailly | G06F 17/30241 |
| | | | 455/457 |
| 2007/0288511 A1* | 12/2007 | Zink | G06F 17/30864 |
| 2009/0179915 A1 | 7/2009 | Fujinaga | |
| 2009/0180713 A1* | 7/2009 | Bucha | G06T 3/0012 |
| | | | 382/300 |
| 2009/0290046 A1* | 11/2009 | Kita | H04N 5/23222 |
| | | | 348/231.99 |
| 2010/0277611 A1* | 11/2010 | Holt | G06F 17/30265 |
| | | | 348/231.2 |
| 2011/0007086 A1* | 1/2011 | Kim | G06T 11/001 |
| | | | 345/581 |
| 2011/0170802 A1* | 7/2011 | Liu | H04N 21/440272 |
| | | | 382/298 |
| 2011/0211770 A1* | 9/2011 | Wang | G06T 3/0093 |
| | | | 382/299 |
| 2011/0283223 A1* | 11/2011 | Vaittinen | G01C 21/3647 |
| | | | 715/781 |
| 2013/0239063 A1* | 9/2013 | Ubillos | H04L 51/24 |
| | | | 715/838 |
| 2013/0297206 A1* | 11/2013 | Heng | G01C 21/00 |
| | | | 701/532 |
| 2013/0321461 A1* | 12/2013 | Filip | G06F 3/011 |
| | | | 345/632 |
| 2014/0104477 A1* | 4/2014 | Choi | G11B 27/28 |
| | | | 348/333.05 |
| 2014/0300776 A1* | 10/2014 | Wu | H04M 1/72572 |
| | | | 348/231.5 |
| 2014/0301663 A1* | 10/2014 | Livingston | G06T 3/40 |
| | | | 382/298 |
| 2015/0103222 A1* | 4/2015 | Choi | H04N 1/00411 |
| | | | 348/333.05 |
| 2015/0170403 A1* | 6/2015 | Barcay | G06K 9/00476 |
| | | | 345/427 |
| 2015/0205454 A1* | 7/2015 | Ainslie | G06F 3/0485 |
| | | | 715/739 |
| 2015/0242543 A1* | 8/2015 | Bailly | G06F 17/30241 |
| | | | 707/722 |
| 2016/0212357 A1* | 7/2016 | Cheng | H04N 5/2257 |

FOREIGN PATENT DOCUMENTS

| | | | | |
|---|---|---|---|---|
| CN | 103685960 A | | 3/2014 | |
| CN | 104079823 A | | 10/2014 | |
| EP | 2631756 | * | 11/2014 | ........... G06F 3/0488 |
| WO | WO2015163548 | * | 10/2015 | ............... H04B 1/40 |

OTHER PUBLICATIONS

Search Report received from the State of Intellectual Property of People's Republic of China for Application No. 201510067666.3 dated Jun. 6, 2017 with English translation (3 pp.).

Final Office Action dated Oct. 20, 2017 for pending U.S. Appl. No. 14/972,314 (22 pp.).

* cited by examiner

FIG. 5

METHOD AND APPARATUS FOR PROCESSING IMAGE DATA

PRIORITY STATEMENT

This application claims the priority benefit of Chinese Patent Application No. 201510067666.3 filed on Feb. 9, 2015, the disclosure of which is incorporated herein in its entirety by reference.

BACKGROUND

Technical Field

The present disclosure relates to the field of image data processing technologies, and in particular, to a method for processing digital image data and an apparatus for processing digital image data.

Related Art

With rapid development of science and technology, electronic devices are widely popular, of which the utilization rate thereof is getting higher and higher in people's work, study, daily communication and other aspects, in other words, the electronic devices are an indispensable part of people's life.

A user starts an image application of an electronic device, to drive image hardware to make image data. When the user post-processes the image data, it is necessary to start other professional image processing tools for processing, which has cumbersome operations, has a high operation threshold, and is very time-consuming.

SUMMARY

The present disclosure provides methods for processing image data to solve the above technical problem, so as to increase simplicity of operation, lower the operation threshold, and reduce the processing time.

Correspondingly, the embodiments of the present disclosure further provide an apparatus for processing image data, so as to ensure implementation and application of the method.

To solve the foregoing problem, the present disclosure discloses a method for processing image data, including:
  generating a first window and a second window;
  loading preview image data in the first window;
  acquiring at least one of a feature image, current time information and geographical location information;
  loading at least one of the feature image, the time information and the geographical location information in the second window; and
  when receiving a generation instruction of the image data, embedding the at least one of the feature image, the time information and the geographical location information into generated target image data according to a first coordinate position, the first coordinate position being a coordinate of the at least one of the feature image, the time information and the geographical location information in the second window relative to the preview image data.

For example, the second window is located above the first window, and the second window is a transparent window.

For example, the step of acquiring at least one of a feature image, current time information and geographical location information includes:

when receiving a select instruction, extracting a feature image corresponding to the select instruction;
  and/or
  reading current time information from an operating system;
  and/or
  acquiring current geographical coordinate information; and
  querying for geographical location information corresponding to the geographical coordinate information.

For example, the step of loading at least one of the feature image, the time information and the geographical location information in the second window includes:
  when receiving a move instruction, altering the position of the at least one of the feature image, the time information and the geographical location information in the second window according to the move instruction.

For example, the second window is further configured to load one or more controls, and the generation instruction is triggered by the controls.

For example, the step of embedding the at least one of the feature image, the time information and the geographical location information into generated target image data according to a first coordinate position includes:
  driving image hardware to generate the target image data;
  recording a first coordinate position of the at least one of the feature image, the time information and the geographical location information in a second layer relative to the preview image data;
  calculating a second coordinate position of the at least one of the feature image, the time information and the geographical location information in the target image data according to the first coordinate position; and
  embedding the at least one of the feature image, the time information and the geographical location information into the target image data according to the second coordinate position.

For example, the step of driving image hardware to generate the target image data includes:
  driving the image hardware to generate the target image data according to a first image proportion; wherein the first image proportion is different from a second image proportion of the preview image data.

For example, the step of calculating a second coordinate position of the at least one of the feature image, the time information and the geographical location information in the target image data according to the first coordinate position includes:
  calculating a relative position relative to the preview image data according to the first coordinate position of the at least one of the feature image, the time information and the geographical location information in the second layer relative to the preview image data; and
  calculating the second coordinate position in the target image data according to the relative position.

The embodiments of the present disclosure further disclose an apparatus for processing image data, including:
  a window generation module, configured to generate a first window and a second window;
  a first loading module, configured to load preview image data in the first window;
  an information acquisition module, configured to acquire at least one of a feature image, current time information and geographical location information;
  a second loading module, configured to load at least one of the feature image, the time information and the geographical location information in the second window; and an image embedding module, configured to, when receiving a generation instruction of the image data, embed the at least one of the feature image, the time information and the geographical location information into generated target image data according to a first coordinate position, the first coordinate position being a coordinate of the at least one of the feature image, the time information and the geographical location information in the second window relative to the preview image data.

For example, the second window is located above the first window, and the second window is a transparent window.

For example, the information acquisition module includes:

a feature image acquisition sub-module, configured to, when receiving a select instruction, extract a feature image corresponding to the select instruction;

and/or a time information reading sub-module, configured to read current time information from an operating system;

and/or a geographical coordinate information acquisition sub-module, configured to acquire current geographical coordinate information; and a geographical location information query sub-module, configured to query for geographical location information corresponding to the geographical coordinate information.

For example, the second loading module includes:

a movement sub-module, configured to, when receiving a move instruction, alter the position of the at least one of the feature image, the time information and the geographical location information in the second window according to the move instruction.

For example, the second window is further configured to load one or more controls, and the generation instruction is triggered by the controls.

For example, the image embedding module includes:

a target image data generation sub-module, configured to drive image hardware to generate the target image data;

a position recording sub-module, configured to record a first coordinate position of the at least one of the feature image, the time information and the geographical location information in a second layer relative to the preview image data;

a position association sub-module, configured to calculate a second coordinate position of the at least one of the feature image, the time information and the geographical location information in the target image data according to the first coordinate position; and a coordinate position embedding sub-module, configured to embed the at least one of the feature image, the time information and the geographical location information into the target image data according to the second coordinate position.

For example, the target image data generation sub-module includes:

a proportion generation sub-module, configured to drive the image hardware to generate the target image data according to a first image proportion; wherein the first image proportion is different from a second image proportion of the preview image data.

For example, the position association sub-module includes:

a relative position calculation sub-module, configured to calculate a relative position relative to the preview image data according to the first coordinate position of the at least one of the feature image, the time information and the geographical location information in the second layer relative to the preview image data; and a coordinate position calculation sub-module, configured to calculate the second coordinate position in the target image data according to the relative position.

Compared with the prior art, the embodiments of the present disclosure include the following advantages:

the embodiments of the present disclosure generate a first window and a second window, load preview image data in the first window, load at least one of a feature image, time information and geographical location information in the second window, and when receiving a generation instruction of the image data, embed the at least one of the feature image, the time information and the geographical location information into generated target image data according to a coordinate relative to the preview image data, which achieve automation of post processing of the image data, and users can perform post-processing without opening professional image processing tools, thus greatly increasing simplicity of operation, lowering the operation threshold, and reducing the processing time.

DETAILED DESCRIPTION

To make the objectives, features and advantages of the present disclosure more comprehensible, the present disclosure is further described below in detail with reference to the accompanying drawings and specific implementations.

Figure 3:
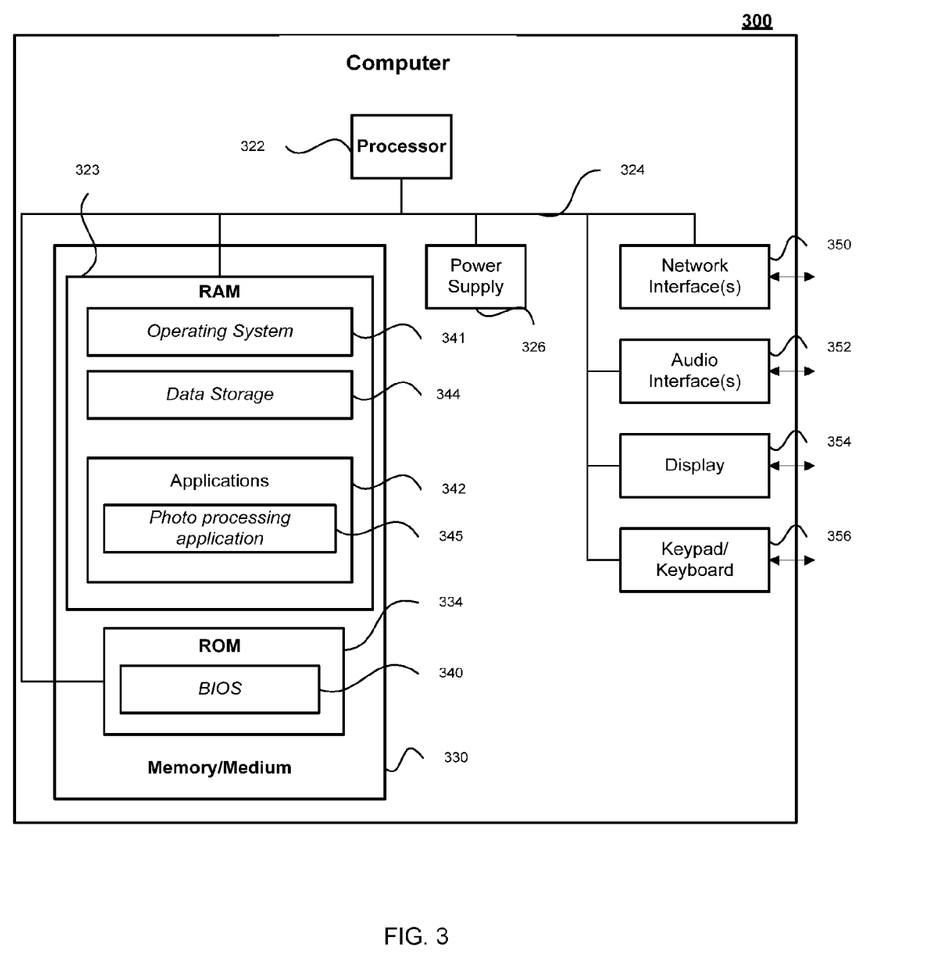
FIG. 3 is a schematic diagram illustrating an example embodiment of an apparatus embodiment for selecting target image data.

FIG. 3 is a schematic diagram illustrating an example embodiment of an apparatus embodiment for selecting target image data as introduced in the present disclosure. The apparatus may execute methods and software systems introduced in the present disclosure. An apparatus 300 may be a computing device capable of executing a software system. The apparatus 300 may, for example, be a device such as a personal desktop computer or a portable device, such as a camera, a laptop computer, a tablet computer, a cellular telephone, or a smart phone.

The apparatus 300 may vary in terms of capabilities or features. Claimed subject matter is intended to cover a wide range of potential variations. For example, the apparatus 300 may include am image processing hardware, such as a camera and/or a webcam. It may also include a keypad/keyboard 356 and a display 354, such as a liquid crystal display (LCD), or a display with a high degree of functionality, such as a touch-sensitive color 2D or 3D display. In contrast, however, as another example, a web-enabled apparatus 300 may include one or more physical or virtual keyboards, and mass storage medium 330.

The apparatus 300 may also include or may execute a variety of operating systems 341. The apparatus 300 may include or may execute a variety of possible applications 342, such as a photo processing application 345. An application 342 may enable communication with other devices via a network, such as communicating with another computer or apparatus 300 via a network.

Further, the apparatus 300 may include one or more non-transitory processor-readable storage media 330 and one or more processors 322 in communication with the non-transitory processor-readable storage media 330. For example, the non-transitory processor-readable storage media 330 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the apparatus 300 configured to conduct operations and/or method steps described in the present disclosure. The one or more processors may be configured to execute the sets of instructions and perform the methods and/or operations in example embodiments of the present disclosure.

Merely for illustration, only one processor will be described in apparatuses that execute operations and/or method steps in the following example embodiments. However, it should be note that the apparatuses in the present disclosure may also include multiple processors, thus operations and/or method steps that are performed by one processor as described in the present disclosure may also be jointly or separately performed by the multiple processors. For example, if in the present disclosure a processor of an apparatus executes both step A and step B, it should be understood that step A and step B may also be performed by two different processors jointly or separately in the apparatus (e.g., the first processor executes step A and the second processor executes step B, or the first and second processors jointly execute steps A and B).

Figure 1:
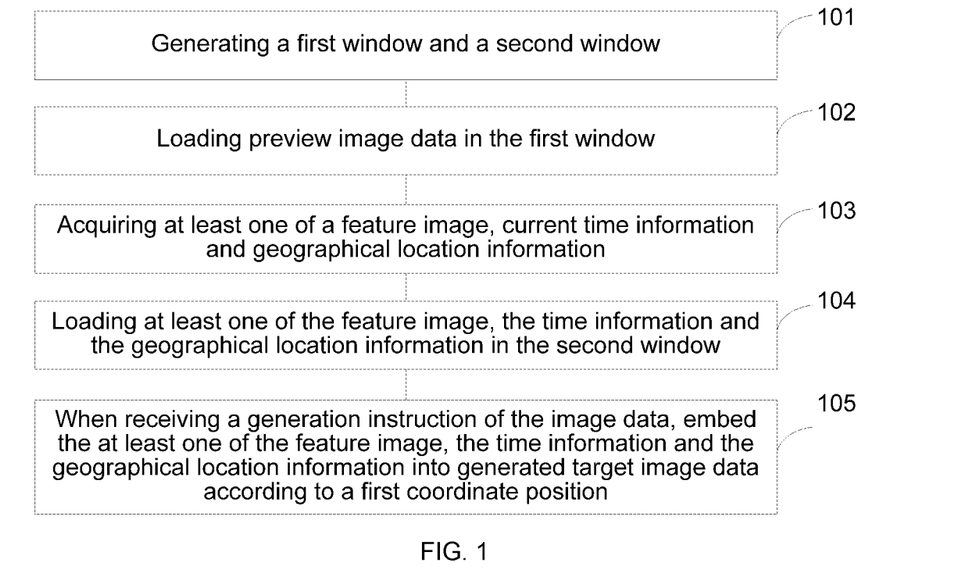
FIG. 1 is a flowchart of steps of one embodiment of a method for processing image data according to the present disclosure.

FIG. 1 is a flowchart of steps of one embodiment of a method for processing image data according to the present disclosure. The method may be implemented as a set of instructions and stored in the storage medium 330 of the apparatus 300. The processor 322 may execute the set of instructions to perform operations of the method. The operations may include:

Step 101. Generating a first window and a second window on a display screen of an electronic device.

It should be noted that, in the embodiment of the present disclosure, the apparatus 300 may be an electronic device with a touch screen, for example, a mobile phone, a Personal Digital Assistant (PDA), a laptop computer, a handheld computer or the like, and may also be applied to an electronic device without a touch screen, for example, a personal computer or the like, which is not limited in the embodiment of the present disclosure.

An operating system of the mobile device may include Android, IOS, Windows Phone (WP) and the like, and generally can support operation of different applications.

The applications may refer to computer programs developed to run on the operating system in order to accomplish one or more functions, for example, an instant messaging tool for instant messaging, an e-mail client for receiving and sending e-mails, a browser for browsing webpages, image applications for driving image hardware and the like.

One application may at least include one process, and one process may be at least associated with one window.

The window is generally the most important part in a user interface, and is a visible interface between a user and an application that generates the window.

In the embodiment of the present disclosure, both the first window and the second window may be substantially windows in the image application, and the first window and the second window may belong to the same process in the image application.

When a user triggers a certain control in the image application, the first window and the second window can be generated.

Further, the second window may be located above the first window, and the second window is a transparent window.

By taking an Android operating system as an example, android:background="#00000000" can be set in the window attribute of the second window, to cause a mask window to be transparent.

Step 102. Loading preview image data in the first window.

In an implementation, the image application can drive image hardware to generate image data.

The image hardware may have an image sensor therein, the image sensor may be a sensor that senses optical image information and converts the optical image information to available output signals. According to different devices, the image sensor can be divided into two categories, i.e., Charge Coupled Devices (CDDs) and Complementary Metal-Oxide Semiconductors (CMOSs).

The principle according to which the image hardware generates image data may be as follows: an acquired optical signal is projected to an image sensor in the image hardware, then the image sensor converts the optical signal to an electrical signal, and the electrical signal is digitally quantified to obtain image data.

In the embodiment of the present disclosure, before the image data is generated, preview data can be provided for the image data in the first window, to let the user choose to generate what kind of image data. The first window showing the preview image data, for example, is illustrated by 402 in relation to the display screen 401 in FIG. 4. The preview image data 403 is shown in the first window 402.

Figure 4:
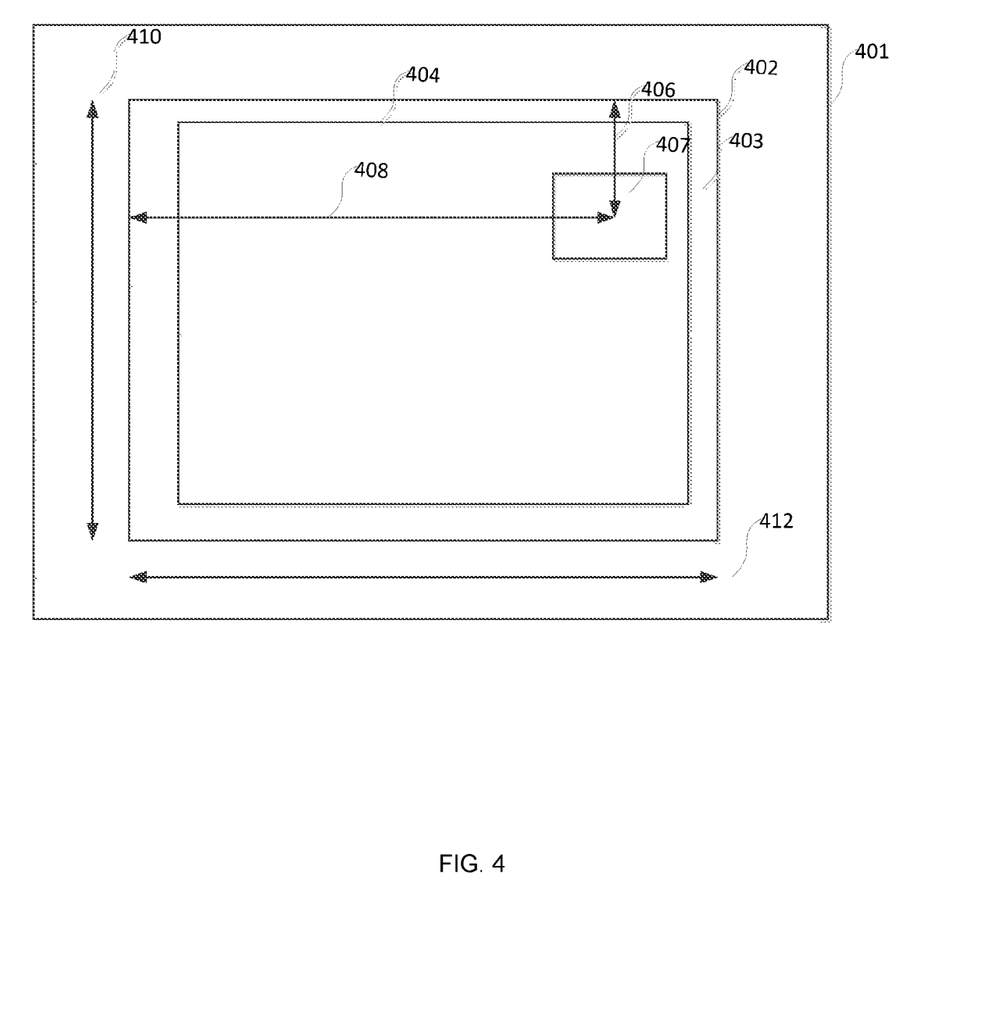
FIG. 4 is a schematic diagram illustrating relative positions of a first window, a second window, and a feature image/time information/geographical location information loaded in the second window.

The preview image data may be images detected at the image hardware, may be written into a cache, but is not image data really generated.

Step 103. Acquiring targeting information such as at least one of a feature image, current time information and geographical location information of the electronic device.

In the embodiment of the present disclosure, at least one of a feature image, time information in an electronic device and information of a geographical location where the electronic device is can be acquired, for post processing.

In one exemplary embodiment of the present disclosure, step 103 may include the following sub-step.

Sub-step S11. When receiving a select instruction, extracting a feature image corresponding to the select instruction.

According to the embodiment of the present disclosure, one or more feature images such as a sample chapter and a seal may be stored in a database.

Information of the feature image such as name and a thumbnail is displayed in a user interface; when a user clicks the information, equivalent to that a select instruction is received, a feature image corresponding to the information is extracted from the database.

In one exemplary embodiment of the present disclosure, step 103 may include the following sub-step.

Sub-step S21. Reading current time information from an operating system.

The time information may include year, month, date, hour, minute, second and so on.

In the embodiment of the present disclosure, a time acquisition function provided by an operating system can be called, to read current time information from the operating system.

For example, in the Android system, Calendar class can be called to acquire current time information;

final Calendar c=Calendar.getInstance( );
mYear=c.get(Calendar.YEAR); //get current year
mMonth=c.get(Calendar.MONTH);//get current month
mDay=c.get(Calendar.DAY_OF_MONTH);//get date number of the current month
mHour=c.get(Calendar.HOUR_OF_DAY);//get the current number of hours
mMinute=c.get(Calendar.MINUTE);// get the current number of minutes In the embodiment of the present disclosure, in order to avoid that the time information is too big, the year, the month and the date can be extracted. Certainly, if necessary, the user can continuously extract the hour, the minute, the seconds and so on, which is not limited in the embodiment of the present disclosure.

In one exemplary embodiment of the present disclosure, step 103 may include the following sub-step.

Sub-step S31. Acquiring current geographical coordinate information.

In an implementation, a current electronic device can acquire current geographical coordinate information through satellite positioning, WIFI positioning, base station positioning, Cell ID positioning, an advanced forward-link triangulation (AFLT) positioning or the like.

The satellite positioning can perform positioning by sending a position signal of a terminal to a positioning background. Currently, available satellite positioning systems include GPSs, GLONASSs, Beidou systems, Galileo systems and so on.

The WIFI positioning can perform positioning according to signal strength and global unique MAC address (Media Access Control Address, or called hardware address, configured to define a position of a network device) sent by WIFI hotspots deployed in various places.

The base station positioning can determine the position of the terminal by using a distance measured between a base station of an operator (e.g., a mobile operator, a Unicom operator, a telecom operator and so on) and the terminal.

The Cell ID positioning can report a cell number (which can be estimated according to a serving base station) of the terminal through a wireless network (e.g., a cellular network), and a position service platform translates the cell number into latitude and longitude coordinates.

When a positioning operation is performed in the AFLT manner, the terminal monitors pilot information of multiple base stations (at least three base stations) at the same time, a distance from the terminal to a neighboring base station is determined by using chip delay, and the position of the terminal is finally calculated through triangulation location.

By taking GPS as an example, an example of a format of GPS data GPRMC obtained can be as follows:

$GPRMC,<1>,<2>,<3>,<4>,<5>,<6>,<7>,<8>,<9>, <10>,<11>,<12>;

wherein Field <1> is standard positioning time (UTC time), of which the format may be: hhmmss.sss; Field <2> is positioning state, including A=data is available, V=data is not available; Field <3> is latitude, of which the format may be: ddmm.mmmm; Field <4> is latitude discrimination, including the Northern Hemisphere (N) or the Southern Hemisphere (S); Field <5> is longitude, of which the format may be: ddmm.mmmm; Field <6> is longitude discrimination, including the Eastern Hemisphere (E), or the Western Hemisphere (W); Field <7> is relative displacement speed, including 0.0 to 1851.8 knots; Field <8> is relative displacement direction, including 000.0 to 359.9 degrees; Field <9> is date, of which the format may be: ddmmyy; Field <10> is magnetic declination, including 000.0° to 180.0°; Field <11> is magnetic declination direction, including E or W; Field <12> is Checksum.

In the example, the geographical coordinate information may include latitude, latitude discrimination, longitude and longitude discrimination.

Sub-step S32. Querying for geographical location information corresponding to the geographical coordinate information.

In the embodiment of the present disclosure, geographical location information corresponding to the geographical coordinate information can be queried through a server, and the server may provide a geographical location identification service and provide an Application Program Interface (API), to let another electronic device to call the geographical location identification service.

The electronic device can assemble the geographical coordinate information as parameters into a request according to interface specifications of the API, and sends the request to the server, so as to call the geographical location identification service.

In the server, geographical location information corresponding to the geographical coordinate information can be identified through reverse geocoding.

The reverse geocoding is relative to geocoding.

A geocoding service can query for geographical coordinate information (e.g., latitude and longitude coordinates) and the like corresponding to the address from conversion of known geographical location information to the corresponding geographical coordinate information (e.g., latitude and longitude coordinates), i.e., according to the geographical location information.

The reverse geocoding may serve for address resolution, which specifically refers to a service of conversion from known geographical coordinate information (e.g., latitude and longitude coordinates) to corresponding geographical location information (e.g., province, block, floor, room and so on).

If the server resolves geographical location information corresponding to the geographical coordinate information, the server can return to the current electronic device.

Step 104. Loading at least one of the feature image, the time information and the geographical location information in the second window.

In the embodiment of the present disclosure, the feature image, the time information and the geographical location information can be loaded in the second window, and the user can select a display style of the feature image, the time information and the geographical location information, for example, combined effect, font style, font color and so on. An exemplary feature image, time information and geographic location information is shown as 407 in FIG. 4. The feature 407 may be dragged and moved around by a user within the second window 404.

In one exemplary embodiment of the present disclosure, step 104 may include the following sub-step.

Sub-step S41. When receiving a move instruction, altering the position of the at least one of the feature image, the time information and the geographical location information in the second window according to the move instruction.

In an implementation, as the second window is transparent, the preview image data in the first window below the second window is still visible.

The user can send a move instruction through a touch screen of a touch electronic device, and drags the at least one of the feature image, the time information and the geographical location information to be displayed in any position of the second window, to preview effects of embedding the at least one of the feature image, the time information and the geographical location information into the image data.

It should be noted that, the second window may also be configured to load one or more controls, the controls can be configured to perform conventional operations of the image application, including how to drive image hardware to generate the image data, for example, controls having a function of generating image data, controls having a function of zooming in/out image data and the like.

Step 105. When receiving a generation instruction of the image data, embedding the at least one of the feature image, the time information and the geographical location information into generated target image data according to a first coordinate position.

The first coordinate position may be a coordinate of the at least one of the feature image, the time information and the geographical location information in the second window relative to the preview image data.

If the second window is loaded with a control, the generation instruction may be triggered by the control, for example, when the user clicks a control having a function of generating image data, it is equivalent to triggering the generation instruction.

In one exemplary embodiment of the present disclosure, step 105 may include the following sub-step.

Sub-step S51. Driving image hardware to generate the target image data.

In actual application, an optical image of a scene generated through a lens of image hardware is projected onto a surface of an image sensor, and then is converted to an electrical signal, and becomes a digital image signal after analog-digital conversion (ND conversion), and a digital signal processing (DSP) chip or an encoded library compresses and converts the digital image signal into a specific image file format for storage.

In one exemplary embodiment of the present disclosure, sub-step S51 may include the following sub-steps.

Sub-step S511. Driving the image hardware to generate the target image data according to a first image proportion.

The first image proportion is different from a second image proportion of the preview image data.

An image proportion (e.g., first image proportion or second image proportion) may be size information of an image (e.g., target image data or preview image data), for example, a length-width ratio is 4:3, 16:9 or the like, may be set by the user, may also be a system default, which is not limited in the embodiment of the present disclosure.

In the embodiment of the present disclosure, image proportions of the target image data and the preview image data are different.

Figure 5:
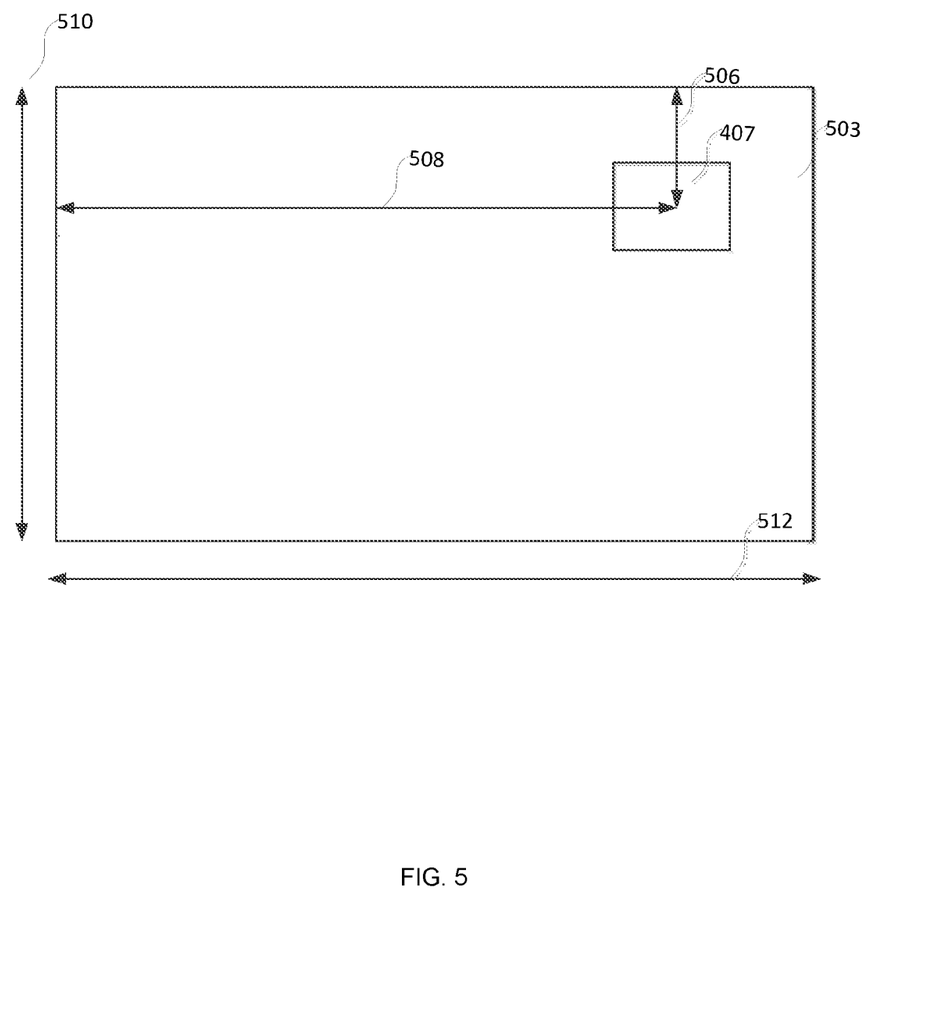
FIG. 5 is a schematic diagram illustrating an image embedded with a feature image/time information/geographic location information.

For example, FIG. 4 shows that the preview image data 403 with a second image proportion (or aspect ratio) determined by the ratio between the image width 412 and the image height of 410 of the preview image 403. This ration may be, for example 4:3. FIG. 5 shows the target image data 503 having a different first image proportion of 16:9 determined by the ratio between the width 512 and the height 510 of the target image 503. Feature 407 is embedded into the target image 503.

Certainly, in the process of generating the target image data, in addition to the image proportion, the image hardware can perform focusing, set the number of the generated image data, set an image size, set a color effect, set sensitivity (ISO), set Exposure, set White_Balance, set Saturation, set contrast, set Sharpness and other processing, which is not limited in the embodiment of the present disclosure.

Sub-step S52. Recording a first coordinate position of the at least one of the feature image, the time information and the geographical location information in a second layer relative to the preview image data.

In the embodiment of the present disclosure, when a generation instruction of the image data is received, a first coordinate position of the at least one of the feature image, the time information and the geographical location information in the second window relative to the preview image data can be recorded, for example, certain positions of the feature image, the time information and the geographical location information in the second window, and in the preview image, how many pixels the positions are from the top, how many pixels the positions are from the left, how many pixels the positions are from the right, how many pixels the positions are from the bottom and so on. This is illustrated in FIG. 4. For example, 406 of FIG. 4 represents a distance from the center of the feature 407 relative to the top edge of the first window 402, and 408 of FIG. 4 represents a distance from the center of the feature 407 relative to the left edge of the first window 402. The distances 406 and 407 may collectively represent the first coordinate position of the feature 407.

Sub-step S53. Calculating a second coordinate position of the at least one of the feature image, the time information and the geographical location information in the target image data according to the first coordinate position.

As the image data has many kinds of size proportions, such as 16:9 and 4:3, that is, the preview image data and the target image data also have many kinds of size proportions, it may result in that the size proportions of the preview image data and the target image data are different.

Therefore, the embodiment of the present disclosure can convert the first coordinate position of the preview image data to a second coordinate position of the target image data, to ensure that the feature image, the time information and the geographical location information can keep the preview effect in the target image data.

In one exemplary embodiment of the present disclosure, sub-step S53 may include the following sub-steps.

Sub-step S531. Calculating a relative position of the at least one of the feature image, the time information, and the geographical location information relative to the preview image data according to the first coordinate position of the at least one of the feature image, the time information and the geographical location information in the second layer relative to the preview image data; and Sub-step S532. Calculating the second coordinate position in the target image data according to the relative position.

In the embodiment of the present disclosure, relative positions of the feature image, the time information and the geographical location information relative to the preview image data can be calculated, for example, the abscissa is 1/A length, the ordinate is 1/B width and so on. In one implementation, a feature image, for example, is positioned at the same relative position along the width direction in the target image as in the preview image and at the same relative position along the height direction in the target image as in the preview image. In FIG. 5, for example, the feature image 407 may be positioned at the same relative position along the width 512 of the target image as the relative position of the feature image 407 along the width direction 412 of FIG. 4. Similarly, the feature image 407 may be positioned at the same relative position along the height direction 510 of the target image as the relative position of the feature image 407 along the height direction 410 of FIG. 4.

The second coordinate position of in the feature image, the time information and the geographical location information in the target image data, e.g., 506 and 508 of FIG. 5, is calculated according to the relative positions.

Sub-step S54. Embedding the at least one of the feature image, the time information and the geographical location information into the target image data according to the second coordinate position.

After the target image data is generated, the at least one of the feature image, the time information and the geographical location information can be embedded into the target image data according to the second coordinate position, for example, the at least one of the feature image, the time information and the geographical location information is embedded into the positions of, for example, how many pixels from the top, how many pixels from the left, how many pixels from the right, how many pixels from the bottom and so on.

Meanwhile, a display style of the at least one of the feature image, the time information and the geographical location information that has been selected by the user can be kept, combined effect, font style, font color and so on.

It should be noted that, the method embodiments, for ease of description, are expressed as a combination of a series of actions, but those skilled in the art should know that the embodiments of the present disclosure are not limited by the action order described, because some steps may be in another order or performed at the same time according to the embodiments of the present disclosure. Secondly, those skilled in the art should also know that the embodiments described in the specification belong to exemplary embodiments, and the actions involved therein may not be necessary for the embodiments of the present disclosure.

Figure 2:
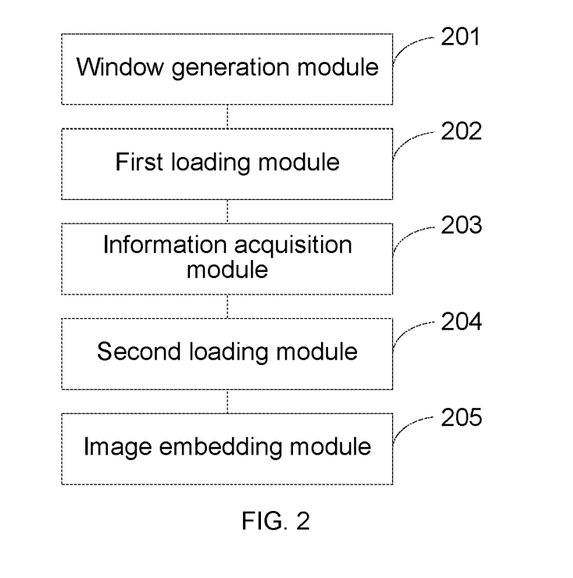
FIG. 2 is a structural diagram of one embodiment of an apparatus for processing image data according to the present disclosure.

FIG. 2 is a structural diagram of one embodiment of an apparatus for processing image data according to the present disclosure, which may specifically include the following modules:

A window generation module 201, configured to generate a first window and a second window;

A first loading module 202, configured to load preview image data in the first window;

An information acquisition module 203, configured to acquire at least one of a feature image, current time information and geographical location information;

A second loading module 204, configured to load at least one of the feature image, the time information and the geographical location information in the second window; and An image embedding module 205, configured to, when receiving a generation instruction of the image data, embed the at least one of the feature image, the time information and the geographical location information into generated target image data according to a first coordinate position, the first coordinate position being a coordinate of the at least one of the feature image, the time information and the geographical location information in the second window relative to the preview image data.

In one exemplary embodiment of the present disclosure, the second window is located above the first window, and the second window is a transparent window.

In one exemplary embodiment of the present disclosure, the information acquisition module 203 may include the following sub-modules:

A feature image acquisition sub-module, configured to, when receiving a select instruction, extract a feature image corresponding to the select instruction; and/or A time information reading sub-module, configured to read current time information from an operating system; and/or A geographical coordinate information acquisition sub-module, configured to acquire current geographical coordinate information; and A geographical location information query sub-module, configured to query for geographical location information corresponding to the geographical coordinate information.

In one exemplary embodiment of the present disclosure, the second loading module 204 may include the following sub-module:

A movement sub-module, configured to, when receiving a move instruction, alter the position of the at least one of the feature image, the time information and the geographical location information in the second window according to the move instruction.

In one exemplary embodiment of the present disclosure, the second window may be further configured to load one or more controls, and the generation instruction is triggered by the controls.

In one exemplary embodiment of the present disclosure, the image embedding module 205 may include the following sub-modules:

A target image data generation sub-module, configured to drive image hardware to generate the target image data;

A position recording sub-module, configured to record a first coordinate position of the at least one of the feature image, the time information and the geographical location information in a second layer relative to the preview image data;

A position association sub-module, configured to calculate a second coordinate position of the at least one of the feature image, the time information and the geographical location information in the target image data according to the first coordinate position; and A coordinate position embedding sub-module, configured to embed the at least one of the feature image, the time information and the geographical location information into the target image data according to the second coordinate position.

In one exemplary embodiment of the present disclosure, the target image data generation sub-module may include the following sub-module:

A proportion generation sub-module, configured to drive the image hardware to generate the target image data according to a first image proportion; wherein the first image proportion is different from a second image proportion of the preview image data.

In one exemplary embodiment of the present disclosure, the position association sub-module may include the following sub-modules:

A relative position calculation sub-module, configured to calculate a relative position relative to the preview image data according to the first coordinate position of the at least one of the feature image, the time information and the geographical location information in the second layer relative to the preview image data; and A coordinate position calculation sub-module, configured to calculate the second coordinate position in the target image data according to the relative position.

For the apparatus embodiments, the description is relatively simple as they are basically similar to the method embodiments, and reference can be made to the corresponding description in the method embodiments for related content.

The embodiments in the specification are described in a progressive manner, each embodiment focuses on describing differences between the embodiment and other embodiments, and mutual reference can be made to the same or similar parts between the embodiments.

Those skilled in the art should understand that, the embodiments of the present disclosure can be provided as methods, apparatus or computer program products. Therefore, the embodiments of the present disclosure can be in the form of full hardware embodiments, full software embodiments, or embodiments of a combination of software and hardware. Moreover, the embodiments of the present disclosure can be in the form of computer program products implemented on one or more computer available storage mediums (including, but not limited to, magnetic disk storages, CD-ROMs, optical storages and the like) including computer available program codes.

The embodiments of the present disclosure are described with reference to the flowchart and/or block diagram of the method, the terminal device (system) and the computer program product according to the embodiments of the present disclosure. It should be understood that each process and/or block in the flowchart and/or block diagram and a combination of the process and/or block in the flowchart and/or block diagram may be implemented by computer program instructions. The computer program instructions can be provided for general-purpose computers, special-purpose computers, embedded processors or processors of other programmable data processing terminal devices to generate a machine, to cause the instructions executed by the computers or the processors of other programmable data processing terminal devices to generate apparatuses configured to implement functions designated in one or more processes of the flowchart and/or one or more blocks in the block diagram.

The computer program instructions may also be stored in computer readable storages which can guide the computers or the processors of other programmable data processing terminal devices to operate in a specific manner, to cause the instructions stored in the computer readable storages to generate articles of manufacture including instruction apparatuses, and the instruction apparatuses implement the functions designated in one or more processes of the flowchart and/or one or more blocks in the block diagram.

The computer program instructions may also be loaded to the computers or the processors of other programmable data processing terminal devices, to perform a series of operation steps on the computers or the processors of other programmable data processing terminal devices to generate processing implemented by the computers, so that the instructions executed on the computers or the processors of other programmable data processing terminal devices provide steps configured to implement the functions designated in one or more processes of the flowchart and/or one or more blocks in the block diagram.

Although the exemplary embodiments of the embodiments of the present disclosure have been described, once those skilled in the art know the basic concept of creativity, they may make other changes and modifications to the embodiments. Therefore, the appended claims are intended to be explained as including the exemplary embodiments and all the changes and modifications falling within the scope of the embodiments of the present disclosure.

Finally, it should be noted that, herein, the relational terms such as first and second are merely used to distinguish one entity or operation from another entity or operation, but may not necessarily require or imply that the entities or operations have any such an actual relation or order therebetween. Moreover, the terms "include" and "comprise" or any other variants intend to cover non-exclusive inclusion, so that processes, methods, articles or terminal devices including a series of elements not only include the elements, but also include other elements not explicitly listed, or also include inherent elements of the processes, methods, articles or terminal devices. In the absence of more limitations, the elements defined by the expression "including one . . . " do not exclude that the processes, methods, articles or terminal devices including the elements also include other identical elements.

The above introduces a method for processing image data and an apparatus for processing image data according to the present disclosure in detail, specific examples are applied therein to elaborate the principle and implementations of the present disclosure, and the description about the embodiments is merely used to help understand the methods of the present disclosure and core ideas thereof; meanwhile, those of ordinary skill in the art may make variations to specific implementations and application scopes according to the ideas of the present disclosure; to sum up, the content of the specification should not be understood as limitations to the present disclosure.

The invention claimed is:

1. An image acquisition device, comprising:
a non-transitory storage medium including a set of instructions for processing image data; and
a processor in communication with the non-transitory storage medium, when executing the set of instructions, the processor is directed to:
generate a first window and a second window on a display screen of the image acquisition device;
load data for a preview image having a first length-width ratio in the first window as a displayed preview image, wherein the second window is located above the first window, and the second window is a transparent window such that the displayed preview image in the first window below the second window is visible;
acquire target information including at least one of a feature image, current time information, and geographical location information of the image acquisition device;
load the target information in the second window as a target feature movable by a user within the second window;
determine a first pixel coordinate of the target feature relative to the preview image;
calculate a third relative position of the target feature relative to the preview image data based on the first pixel coordinate; and
upon receiving an image generation instruction:

generate a target image data of the preview image data, wherein the target image data comprises a second length-width ratio different from the first length-width ratio;

determine a second pixel coordinate relative to the target image data based on the third relative position, the first length-width ratio, and the second length-width ratio;

embed the target information into the target image data after the target image data is generated by the image acquisition device at the second pixel coordinate relative to the target image data; and store the target image data embedded with the target information in an image storage of the image acquisition device.

2. The image acquisition device according to claim 1, wherein to acquire the target information the processor is directed to, when receiving a select instruction, performing at least one of:

extract the feature image corresponding to the select instruction;

read the current time information from an operating system of the image acquisition device; and acquire current geographical coordinate information of the image acquisition device and query for the geographical location information corresponding to the current geographical coordinate information.

3. The image acquisition device according to claim 1, wherein to load the target information in the second window the processor is further directed to:

when receiving a move instruction, alter a position of the target feature in the second window according to the move instruction.

4. The image acquisition device according to claim 1, wherein the second window is further configured to load one or more controls, and the image generation instruction is triggered by the one or more controls.

5. A method for processing image data in an image acquisition device having a processor and an image storage, comprising:

generating, by the processor, a first window and a second window on a display screen of the image acquisition device;

loading, by the processor, data for a preview image having a first length-width ratio in the first window as a displayed preview image, wherein the second window is located above the first window, and the second window is a transparent window such that the displayed preview image in the first window below the second window is visible;

acquiring, by the processor, target information including at least one of a feature image, current time information, and geographical location information of the image acquisition device;

loading, by the processor, the target information in the second window as a target feature movable by a user within the second window;

determining, by the processor, a first pixel coordinate of the target feature relative to the preview image;

calculating, by the processor, a third relative position of the target feature relative to the preview image data based on the first pixel coordinate; and upon receiving an image generation instruction:

generating, a target image data of the preview image data, wherein the target image data comprise a second length-width ratio different from the first length-width ratio;

determining, by the processor, a second pixel coordinate relative to the target image data based on the third relative position, the first length-width ratio, and the second length-width ratio;

embedding, by the image acquisition device and after the target image data is generated by the image acquisition device, the target information into the target image data at the second pixel coordinate relative to the target image data; and storing the target image data embedded with the target information in the image storage.

6. The method according to claim 5, wherein the acquiring the target information comprises, when receiving a select instruction, performing at least one of:

extracting the feature image corresponding to the select instruction;

reading the current time information from an operating system of the image acquisition device; and acquiring current geographical coordinate information of the image acquisition device and querying for the geographical location information corresponding to the current geographical coordinate information.

7. The method according to claim 5, wherein the loading of the target information in the second window comprises:

when receiving a move instruction, altering a position of the target feature in the second window according to the move instruction.

8. The method according to claim 5, wherein the second window is further configured to load one or more controls, and the image generation instruction is triggered by the one or more controls.

9. A processor-readable non-transitory storage medium, comprising a set of instructions for processing image data through an electronic device, wherein when the set of instructions is executed by a processor of the electronic device, the set of instructions directs the processor to perform acts of:

generating a first window and a second window on a display screen of the electronic device;

loading data for a preview image having a first length-width ratio in the first window as a displayed preview image, wherein the second window is located above the first window, and the second window is a transparent window such that the displayed preview image in the first window below the second window is visible;

acquiring target information including at least one of a feature image, current time information, and geographical location information of the electronic device;

loading the target information in the second window as a target feature movable by a user within the second window;

determining a first pixel coordinate of the target feature relative to the preview image;

calculating a third relative position of the target feature relative to the preview image data based on the first pixel coordinate; and upon receiving an image generation instruction:

generating a target image data of the preview image data, wherein the target image data comprises a second length-width ratio different from the first length-width ratio;

determining a second pixel coordinate relative to the target image data based on the third relative position, the first length-width ratio, and the second length-width ratio;

embedding, after the target image data is generated, the target information into the target image data at the second pixel coordinate relative to the target image data; and storing the target image data embedded with the target information in an image storage.

10. The processor-readable non-transitory storage medium according to claim 9, wherein loading of the target information in the second window comprises:

when receiving a move instruction, altering a position of the target feature in the second window according to the move instruction.

11. The processor-readable non-transitory storage medium of claim 9, wherein the set of instructions further direct the processor to perform act of loading one or more controls into the second window and wherein the image generation instruction is triggered by the one or more controls.

12. The processor-readable non-transitory storage medium of claim 9, wherein the acquiring the target information comprises, when receiving a select instruction, performing at least one of:

extracting the feature image corresponding to the select instruction;

reading the current time information from an operating system of the electronic device; and acquiring current geographical coordinate information of the electronic device and querying for the geographical location information corresponding to the current geographical coordinate information.

* * * * *